(12) United States Patent
Sasaki (10) Patent No.: US 11,616,902 B2
(45) Date of Patent: Mar. 28, 2023

(54) APPARATUS TO PERFORM ALIGNMENT TO IMAGES, IMAGE PROCESSING METHOD TO PERFORM ALIGNMENT TO IMAGES, AND COMPUTER READABLE NON-TRANSITORY MEMORY TO PERFORM ALIGNMENT TO IMAGES

(71) Applicant: CANON KABUSHIKI KAISHA, Tokyo (JP)

(72) Inventor: Takao Sasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 84 days.

(21) Appl. No.: 17/153,637

(22) Filed: Jan. 20, 2021

(65) Prior Publication Data
US 2021/0243377 A1  Aug. 5, 2021

(30) Foreign Application Priority Data
Jan. 30, 2020 (JP) .............................. JP2020-014082

(51) Int. Cl.
*H04N 5/232* (2006.01)
(52) U.S. Cl.
CPC ... *H04N 5/232125* (2018.08); *H04N 5/23232* (2013.01); *H04N 5/232127* (2018.08); *H04N 5/232133* (2018.08)
(58) Field of Classification Search
CPC ....... H04N 5/232125; H04N 5/232127; H04N 5/232133; H04N 5/23232; H04N 5/232123; H04N 5/23216; H04N 5/232935; H04N 5/232945
See application file for complete search history.

(56) References Cited

U.S. PATENT DOCUMENTS

| | | | |
|---|---|---|---|
| 6,456,731 B1 * | 9/2002 | Chiba | G06T 7/33 382/284 |
| 8,023,000 B2 * | 9/2011 | Tamaru | H04N 5/2356 348/222.1 |
| 8,970,722 B2 * | 3/2015 | Saito | H04N 5/2355 348/222.1 |
| 2013/0016180 A1 * | 1/2013 | Ono | G06T 7/223 348/E7.001 |
| 2015/0117539 A1 * | 4/2015 | Kobayashi | H04N 19/176 375/240.16 |
| 2015/0358542 A1 * | 12/2015 | Sato | G06T 5/003 348/239 |

FOREIGN PATENT DOCUMENTS

JP 2015186088 A 10/2015

* cited by examiner

*Primary Examiner* — Timothy J Henn
(74) *Attorney, Agent, or Firm* — Canon U.S.A., Inc. IP Division (57) ABSTRACT

An apparatus includes at least one memory configured to store instructions, and at least one processor in communication with the at least one memory and configured to execute the instructions to detect a feature amount from each of a plurality of images different in in-focus position in an optical axis direction, and align the plurality of images by using the feature amount. The at least one processor further executes instructions to detect the feature amount by preferentially using a focusing area of each of the plurality of images.

17 Claims, 9 Drawing Sheets

FIG.9

APPARATUS TO PERFORM ALIGNMENT TO IMAGES, IMAGE PROCESSING METHOD TO PERFORM ALIGNMENT TO IMAGES, AND COMPUTER READABLE NON-TRANSITORY MEMORY TO PERFORM ALIGNMENT TO IMAGES

BACKGROUND OF THE DISCLOSURE

Field of the Disclosure

The aspect of the embodiments relates to an image processing apparatus that combines a plurality of images different in in-focus position in an optical axis direction.

Description of the Related Art

In a case where images of a plurality of objects that is largely different in distance from a digital camera are captured or in a case where an image of an object long in a depth direction is captured, a part of the object can be in focus because of an insufficient depth of field. To solve such an issue, Japanese Patent Application Laid-Open No. 2015-186088 discusses a focus stacking composition technique in which a plurality of images different in in-focus position is captured, a focusing area is extracted from each of the images, and the extracted focusing areas are combined to generate one composite image in which the entire imaging area is in focus. To perform the focus stacking composition, the images are aligned because field angles of the images different in in-focus position are finely different and due to the effect of camera shake in the imaging. Japanese Patent Application Laid-Open No. 2015-186088 discusses a technique for performing alignment in which blocks are set in each of the images to calculate a moving amount by using the blocks.

When the image alignment is performed, in one embodiment, the blocks are arranged first in the focusing area of the image because a feature amount such as a motion vector calculated from the focusing area of the image is high in accuracy.

However, those images captured for the focus stacking composition are different in position of the focusing area. When the blocks are arranged in the same manner, accuracy of the alignment may be deteriorated.

SUMMARY OF THE DISCLOSURE

According to an embodiment of the disclosure, an image processing apparatus includes at least one memory configured to store instructions, and at least one processor in communication with the at least one memory and configured to execute the instructions to detect a feature amount from each of a plurality of images different in in-focus position in an optical axis direction, and align the plurality of images by using the feature amount. The at least one processor further executes instructions to detect the feature amount by preferentially using a focusing area of each of the plurality of images.

Further features of the disclosure will become apparent from the following description of exemplary embodiments with reference to the attached drawings.

DESCRIPTION OF THE EMBODIMENTS

Exemplary embodiments of the disclosure are described in detail below with reference to accompanying drawings.

Figure 1:
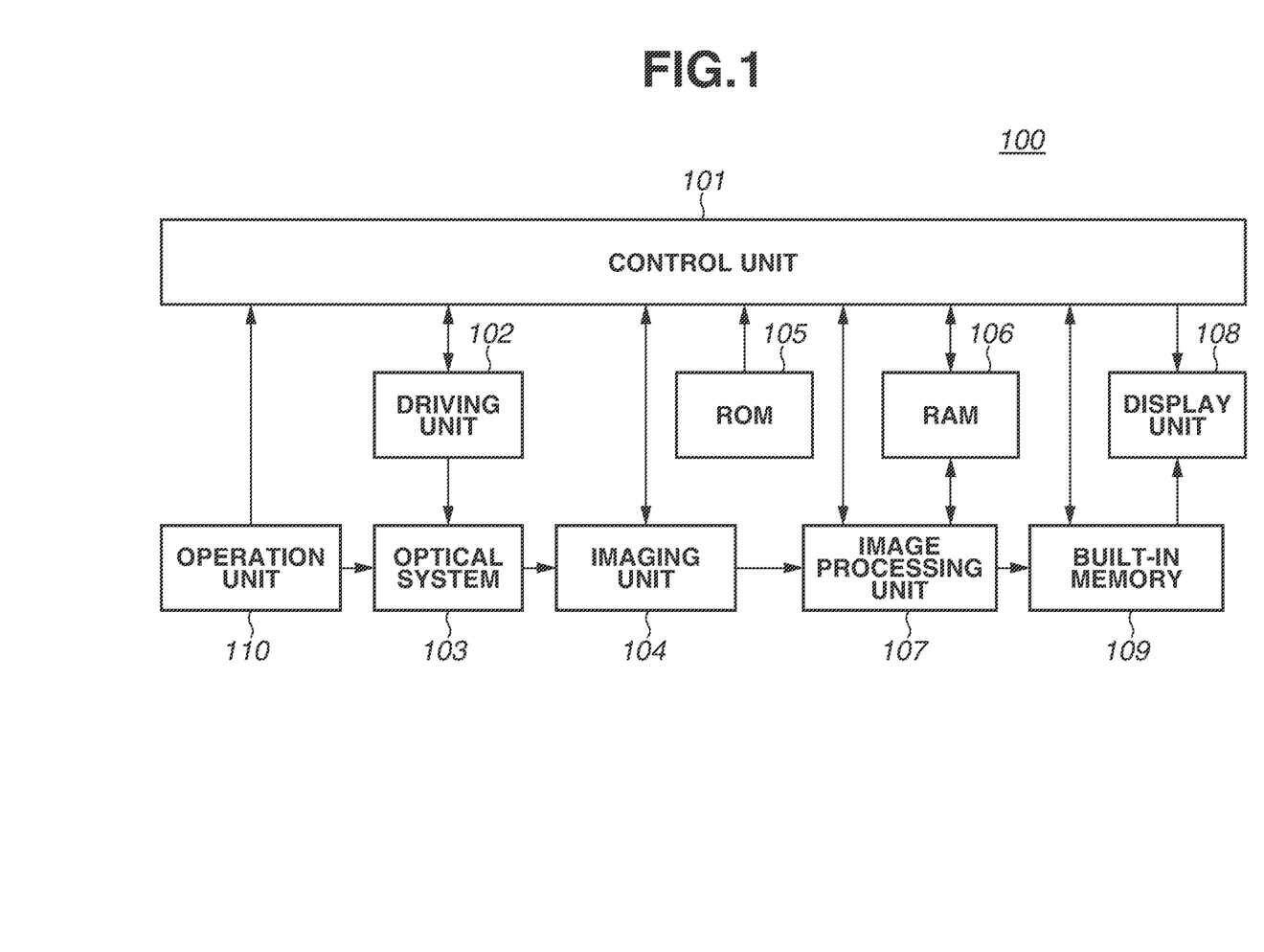
FIG. 1 is a block diagram illustrating a configuration of a digital camera according to an exemplary embodiment of the disclosure.

FIG. 1 is an example of a block diagram illustrating a configuration of a digital camera as an image processing apparatus according to a first exemplary embodiment. A digital camera 100 can capture a still image, record information on a focus position, calculate a contrast value, and combine images. Further, the digital camera 100 can perform enlargement processing or reduction processing on an image captured and stored, or an image input from outside.

A control unit 101 is a signal processor such as a central processing unit (CPU) and a micro processing unit (MPU), and controls units of the digital camera 100 while reading out a program previously stored in a read only memory (ROM) 105 described below. For example, as described below, the control unit 101 instructs an imaging unit 104 described below to start and end imaging. The control unit 101 also instructs an image processing unit 107 described below to perform image processing based on the program stored in the ROM 105. An instruction from a user is input to the digital camera 100 by an operation unit 110 described below, and is transmitted to each of the units of the digital camera 100 via the control unit 101.

A driving unit 102 includes a motor, and mechanically operates an optical system 103 described below under the instruction of the control unit 101. For example, the driving unit 102 moves a position of a focus lens included in the optical system 103 to adjust a focal length of the optical system 103 based on the instruction of the control unit 101.

The optical system 103 includes a zoom lens, the focus lens, and a diaphragm. The diaphragm is a mechanism for adjusting a quantity of light to be transmitted. A focus position is changeable by changing the positions of the lenses.

The imaging unit 104 is a photoelectric conversion device that performs photoelectric conversion to convert an incident optical signal into an electric signal. For example, a charge-coupled device (CCD) sensor or a complementary metal-oxide semiconductor (CMOS) sensor is adoptable as the imaging unit 104. The imaging unit 104 has a moving image capturing mode, and can capture a plurality of temporally continuous images as frames of a moving image.

The ROM 105 is a nonvolatile read-only memory as a recording medium, and stores parameters for operation of each of the units in addition to an operation program for each of the units included in the digital camera 100. A random access memory (RAM) 106 is a rewritable volatile memory, and is used as a temporary storage area of data output in the operation of each of the units included in the digital camera 100.

The image processing unit 107 performs various image processing such as white balance adjustment, color interpolation, and filtering on the images output from the imaging unit 104 or data of an image signal recorded in a built-in memory 109 described below. The image processing unit 107 also performs compression processing conforming to a standard such as Joint Photographic Experts Group (JPEG) on data of the images captured by the imaging unit 104.

The image processing unit 107 includes an integrated circuit (application specific integrated circuit (ASIC)) in which circuits each performing specific processing are integrated. Alternatively, the control unit 101 may perform a part or all of the functions of the image processing unit 107 by performing processing based on the program read out from the ROM 105. In a case where the control unit 101 performs all of the functions of the image processing unit 107, the image processing unit 107 as hardware is unnecessary.

A display unit 108 is a liquid crystal display, an organic electroluminescence (EL) display, or other type of display that displays an image temporarily stored in the RAM 106, an image stored in the built-in memory 109 described below, and a setting screen of the digital camera 100.

The built-in memory 109 stores the image captured by the imaging unit 104, the image processed by the image processing unit 107, information on the focus position in imaging, etc. A memory card or the like may be used in place of the built-in memory 109.

The operation unit 110 includes, for example, buttons, switches, keys, and a mode dial provided on the digital camera 100, and examples of the operation unit 110 includes a touch panel also serving as the display unit 108. The instruction from the user is transmitted to the control unit 101 via the operation unit 110.

Figure 2:
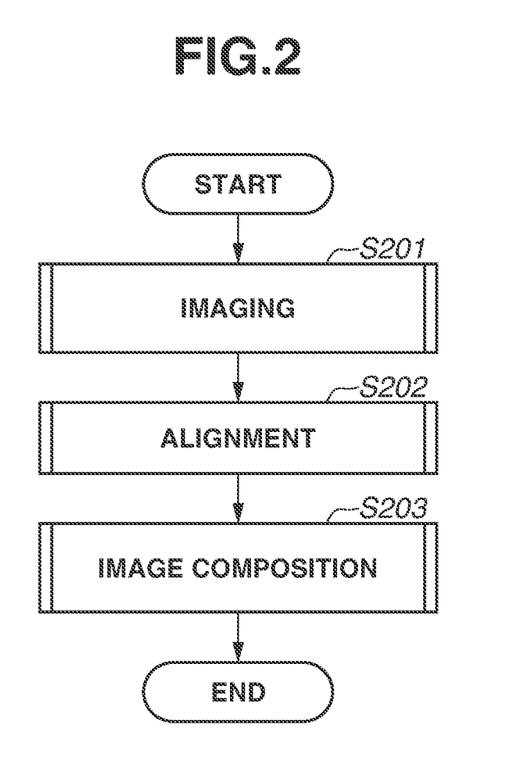
FIG. 2 is a flowchart illustrating generation of a composite image according to the exemplary embodiment of the disclosure.

FIG. 2 is a flowchart illustrating generation of a composite image according to the present exemplary embodiment. In step S201, the imaging unit 104 captures a plurality of images at respectively different in-focus positions in an optical axis direction. In step S202, the control unit 101 performs alignment on the plurality of images captured by the imaging unit 104 in step S201. In step S203, the image processing unit 107 combines the aligned images to generate a composite image having a deeper depth of field. In the following, each of the steps will be described in detail.

Figure 3:
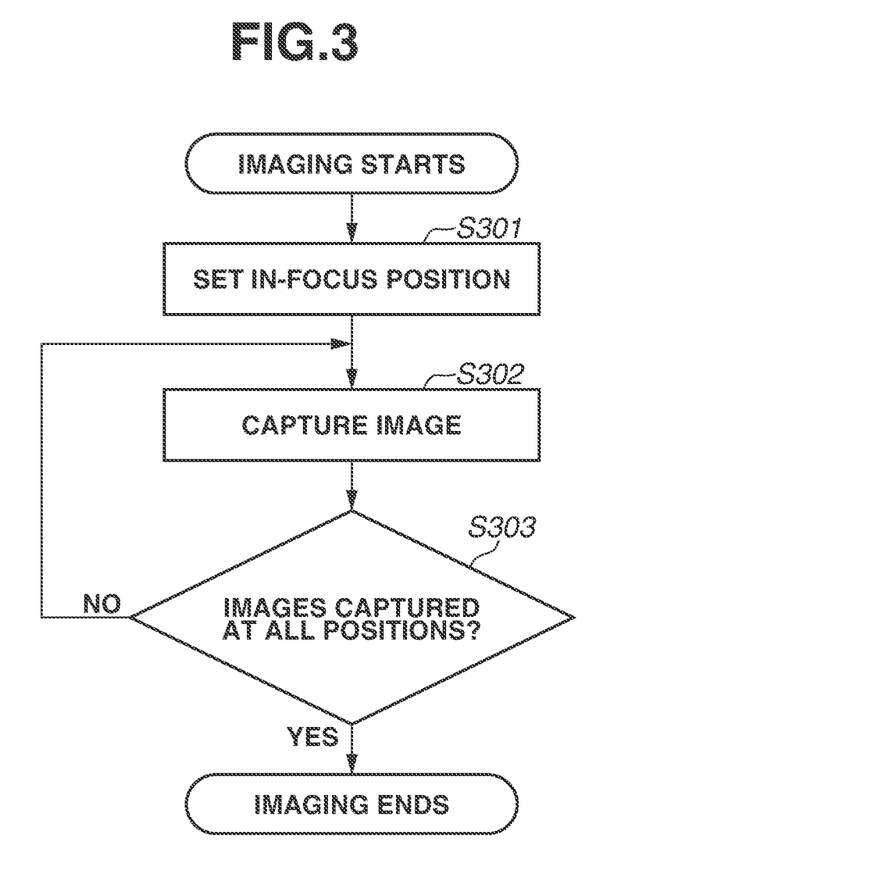
FIG. 3 is a flowchart illustrating imaging according to the exemplary embodiment of the disclosure.

FIG. 3 is a flowchart illustrating the imaging in step S201 according to the present exemplary embodiment.

In step S301, the control unit 101 sets an in-focus position. For example, the user designates a focus position via the touch panel also serving as the display unit 108, and designates a plurality of in-focus positions at equal intervals on a front side and a rear side, in the optical axis direction, of an in-focus position corresponding to the designated focus position. At the same time, the control unit 101 determines an imaging order of the set in-focus positions in order of a distance.

In step S302, the imaging unit 104 captures an image at an in-focus position, at which imaging has not been performed and which is the earliest in the imaging order among the in-focus positions set in step S301.

In step S303, the control unit 101 determines whether images have been captured at all of the in-focus positions set in step S301. In a case where images have been captured at all of the set in-focus positions (YES in step S303), the processing in the flowchart is ended. In a case where there is an in-focus position where the image has not been captured (NO in step S303), the processing returns to step S302.

In a case of a multi lens camera including a plurality of imaging units 104, images may be simultaneously captured at the plurality of in-focus positions set in step S301.

Figure 4:
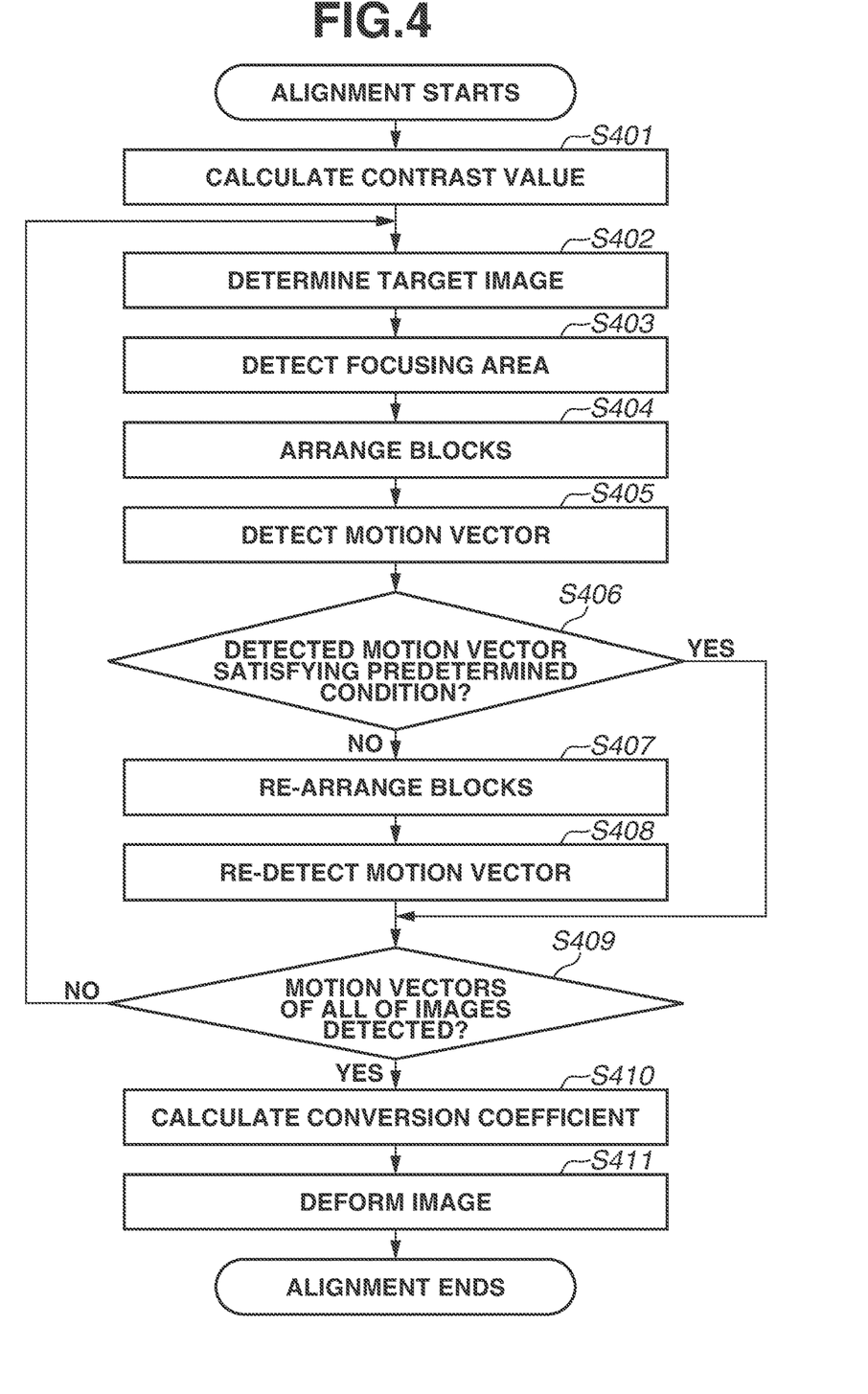
FIG. 4 is a flowchart illustrating alignment according to a first exemplary embodiment.

FIG. 4 is a flowchart illustrating the alignment in step S202 according to the present exemplary embodiment. In the present exemplary embodiment, the control unit 101 detects a motion vector as a feature amount of each image, and performs the alignment by using the motion vector.

In step S401, the image processing unit 107 calculates a contrast value from each of the images captured in step S201. The contrast value calculated at this time is used for rearrangement of blocks and image composition described below.

As an example of a method of calculating the contrast value, for example, the image processing unit 107 first calculates a luminance value Y by using the following equation (1) from color signals Sr, Sg, and Sb of each of pixels.

$$Y = 0.299 Sr + 0.587 Sg + 0.114 Sb \quad (1)$$

Next, a Sobel filter is applied to a matrix L of luminance values Y of 3×3 pixels, and a contrast value I is calculated by using the following equations (2) to (4).

$$I_h = \begin{pmatrix} -1 & 0 & 1 \\ -2 & 0 & 2 \\ -1 & 0 & 1 \end{pmatrix} \cdot L \quad (2)$$

$$I_v = \begin{pmatrix} -1 & -2 & -1 \\ 0 & 0 & 0 \\ 1 & 2 & 1 \end{pmatrix} \cdot L \quad (3)$$

$$I = \sqrt{I_h^2 + I_v^2} \quad (4)$$

The above-described method of calculating the contrast value is merely an example, and for example, an edge detection filter such as a Laplacian filter, or a bandpass filter allowing frequencies in a predetermined band to pass therethrough may be used.

In step S402, the control unit 101 determines target images on which the alignment processing is to be performed. Typically, the control unit 101 determines, from among the images captured in step S201, two temporally adjacent images captured at respective times next to each other are determined as the target images of the alignment processing. For example, a first captured image and a second captured image are first determined as the target images.

In step S403, the control unit 101 detects a focusing area of each of the target images. As a method for detecting a focusing area, for example, information on a focusing area is recorded in imaging, and the focusing area is extracted in step S403. Alternatively, there is another example of the method for detecting a focusing area in which contrast values of all captured images are compared with each other, and an area having a contrast value larger than a contrast value of a corresponding area in the other image may be determined as the focusing area. At this time, an interval between the in-focus positions of the two target images is relatively small, so that it is expected that the focusing areas are largely overlapped.

In step S404, the image processing unit 107 arranges blocks in each of the target images.

FIGS. 5A to 5D are diagrams illustrating arrangement of the blocks according to the present exemplary embodiment.

Figure 5A:
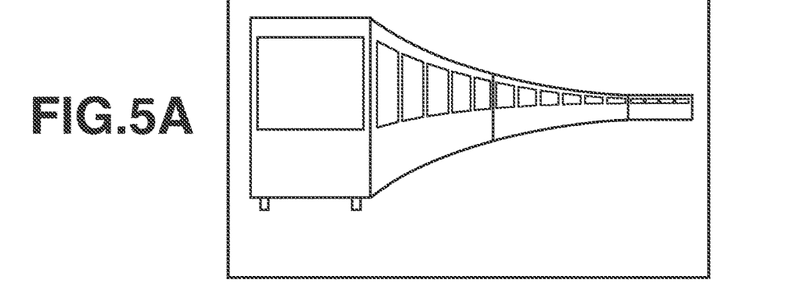
FIGS. 5A to 5D are diagrams illustrating arrangement of blocks according to the first exemplary embodiment.
Figure 5B:
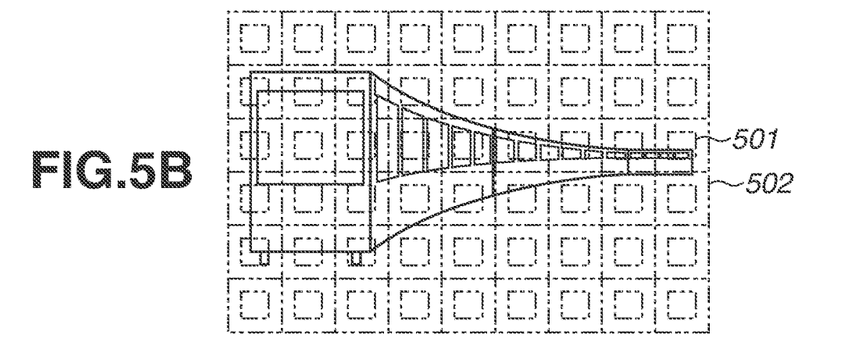
Figure 5C:
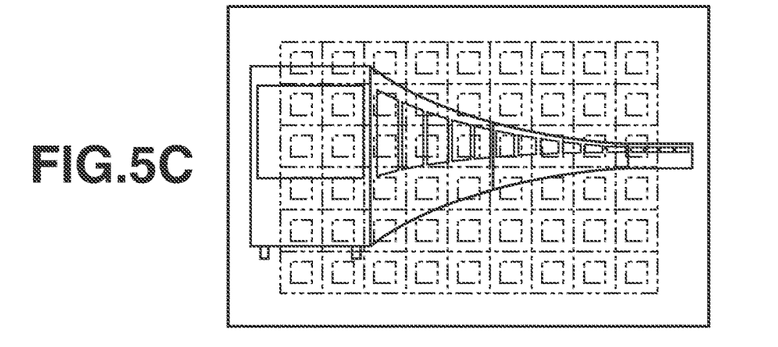

FIG. 5A illustrates an example of the captured image. FIG. 5B illustrates an example of arrangement of blocks in the image illustrated in FIG. 5A. In the example illustrated in FIG. 5B, blocks are arranged on the entire area of the image illustrated in FIG. 5A. FIG. 5C illustrates an example in which blocks are arranged in a part of the area of the image illustrated in FIG. 5A. In FIG. 5B, blocks 501 and search ranges 502 including the respective blocks 501 are illustrated. The search ranges 502 are arranged for detection of a motion vector described below, based on the respective blocks.

Although the numbers of arranged blocks are the same in the examples illustrated in FIG. 5B and FIG. 5C, the number of blocks is not limited thereto. The number of blocks may be changed based on a calculation function of the control unit 101. To accurately detect the motion vector described below, however, blocks similarly in all of the images are to be arranged.

Figure 5D:
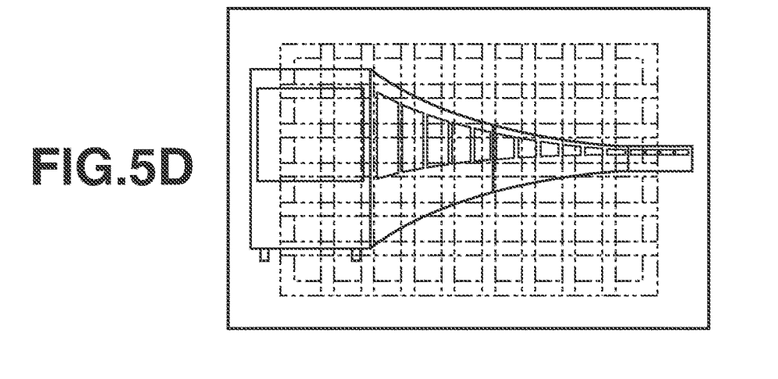

Further, in FIG. 5B and FIG. 5C, the search ranges are arranged so as not to be overlapped with one another. However, the arrangement of the search ranges is not limited thereto. The search ranges may be arranged so as to be overlapped with one another as illustrated in FIG. 5D. In FIG. 5D, although the sizes of the blocks and the search ranges are similar to the sizes of the blocks and the search ranges in FIG. 5B, the blocks and the search ranges do not cover the entire area of the image unlike FIG. 5B because the search ranges are overlapped with one another.

In step S405, the image processing unit 107 detects a motion vector from each of the blocks arranged in step S404. The control unit 101 calculates, in each of the search ranges in one of the target images, a correspondence point at which a sum of absolute difference (hereinafter, referred to as SAD) of luminance values with respect to the corresponding block of the other image becomes minimum. The control unit 101 calculates the motion vector based on the center of the block and the correspondence point of the center of the block. In the above-described calculation of the correspondence point, the control unit 101 may also use a sum of squared difference (hereinafter, referred to as SSD), normalized cross correlation (hereinafter, referred to as NCC), etc., in addition to the SAD.

In step S406, the image processing unit 107 determines whether the motion vectors detected in step S405 satisfy a predetermined condition.

To perform alignment with high accuracy, the motion vectors are required to satisfy a certain condition. For example, as described below, at least three motion vectors not parallel to one another are applied to calculate an affine transformation coefficient. In other words, the alignment cannot be performed unless a predetermined number or more of motion vectors are detected. Further, in a case where the detected motion vectors are excessively small and an influence of the difference is large, the accuracy of the alignment may be low. In other words, the alignment cannot be performed unless the detected motion vectors are each greater than or equal to a threshold value. Moreover, in a case where the motion vectors detected from the blocks are not directed to a certain direction, i.e., in a case where the deviation is large, the accuracy of the alignment may be low. The image processing unit 107 previously determines a condition that the motion vectors are to satisfy, and the image processing unit 107 determines, in step S406, whether the motion vectors satisfy the above-described condition. In a case where the motion vectors do not satisfy the above-described predetermined condition (NO in step S406), the accuracy of the alignment may be low even if the alignment is performed. Therefore, the processing proceeds to step S407 without directly proceeding to the alignment processing. In contrast, in a case where the detected motion vectors satisfy the predetermined condition (YES in step S406), the processing proceeds to step S409.

In step S407, the image processing unit 107 re-arranges the blocks in each of the target images with reference to the focusing area detected in step S403. In one embodiment, the image processing unit 107 refers to a portion where the focusing areas of the two respective target images are overlapped with each other, and arranges the blocks at positions corresponding to the overlapped portion.

Figure 6A:
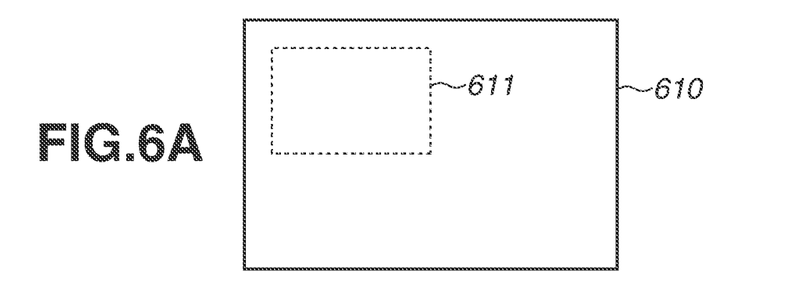
FIGS. 6A to 6E are diagrams illustrating rearrangement of blocks according to the first exemplary embodiment.
Figure 6B:
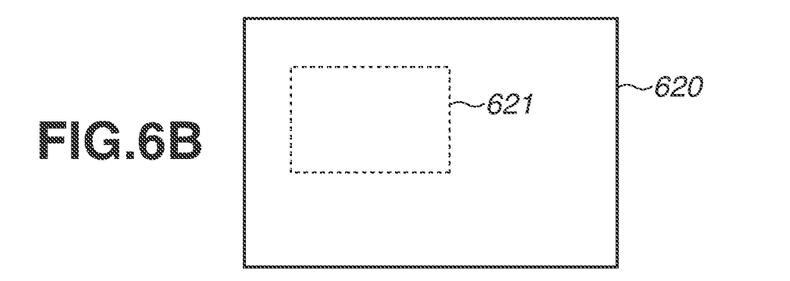
Figure 6C:
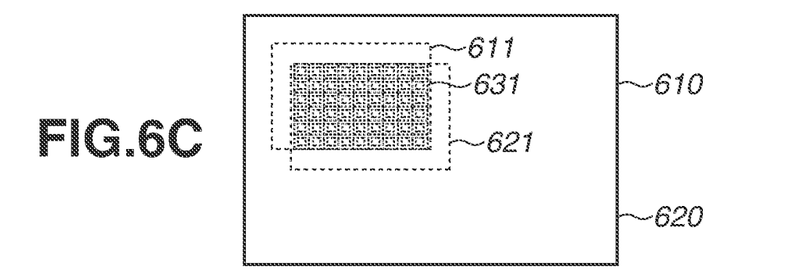
Figure 6D:
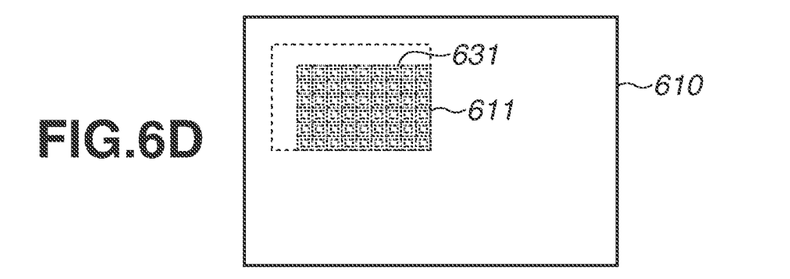
Figure 6E:
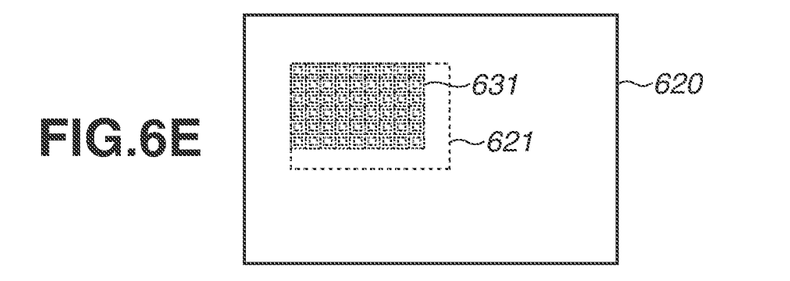

FIGS. 6A to 6E are diagrams illustrating rearrangement of the blocks according to the present exemplary embodiment. An image 610 in FIG. 6A and an image 620 in FIG. 6B are the two target images determined by the control unit 101 in step S402. An area 611 is a focusing area of the image 610a, and an area 621 is a focusing area of the image 620. FIG. 6C illustrates a state where the image 610 and the image 620 are overlapped with each other. In FIG. 6C, a state where blocks are arranged in an area 631 where the focusing area 611 of the image 610 and the focusing area 621 of the image 620 are overlapped is illustrated. FIG. 6D illustrates an area where the blocks are re-arranged in the image 610, and FIG. 6E illustrates an area where the blocks are re-arranged in the image 620.

In the example of FIG. 6C, although the blocks are arranged over the entire area 631, the arrangement of the blocks is not limited thereto, and the blocks may be arranged in a part of the area 631.

If the control nit 101 determines a block rearrangement area, the control unit 101 re-arranges the blocks in the block rearrangement area with density higher than density of the blocks arranged in step S404. For example, the sizes of the blocks and the search ranges are made smaller, and the same number of blocks are re-arranged. In a case where the search ranges arranged in step S404 are not overlapped with one another, the sizes of the blocks and the search ranges are not changed, and the blocks are re-arranged such that the search ranges of the blocks are overlapped with one another as illustrated in FIG. 5D. On the other hand, in a case where the search ranges arranged in step S404 are overlapped with one another, the sizes of the blocks and the search ranges may not be changed, and the blocks may be re-arranged such that the overlapped portions become larger.

In step S408, the image processing unit 107 re-detects the motion vector from each of the blocks re-arranged in step S407. The method of re-detecting a motion vector may be similar to the method of detecting the motion vector in step S405.

In step S409, the control unit 101 determines whether the motion vectors of all of the images have been calculated. In a case where there is an image in which a motion vector has not been calculated (NO in step S409), the processing returns to step S402, and the control unit 101 determines target images again. For example, the control unit 101 determines two target images in order of imaging. In other words, in the first motion vector calculation s, the first image and the second image are determined as target images. In second motion vector calculation, the second image and a third image are determined as target images.

If the motion vectors of all of the images are calculated (YES in step S409), the processing proceeds to step S410. In step S410, a conversion coefficient is calculated. The conversion coefficient is a coefficient for deformation of an image in next step S411. For example, an image can be deformed by using a conversion coefficient A expressed in the following equation (5).

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \quad (5)$$

In the equation (5), (x', y') indicates coordinates after deformation, and (x, y) indicates coordinates before the deformation. When coordinates at a start point and an end point of each of the motion vectors detected from the two target images are respectively defined as (x, y) and (x', y') and three motion vectors not parallel to one another have been detected, the conversion coefficient A in the equation (5) can be calculated. Next, in step S411, the equation (5) is applied to all coordinates in one of the target images by using the calculated conversion coefficient. As a result, the two target images can be aligned. Applying such a method to all pairs of the target images determined in step S402 allows for alignment of all of the images.

Next, in step S203, the image processing unit 107 performs image composition on the aligned images.

Figure 7:
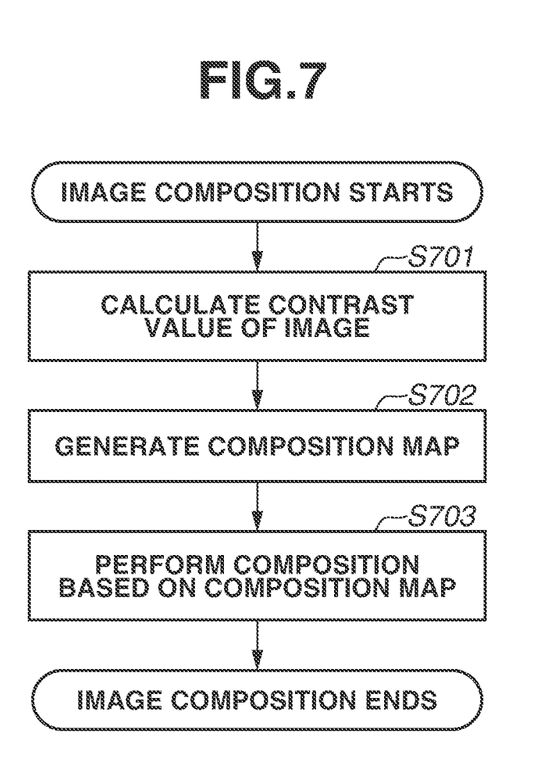
FIG. 7 is a flowchart illustrating image composition according to the exemplary embodiment of the disclosure.

FIG. 7 is a flowchart illustrating image composition according to the present exemplary embodiment.

In step S701, the image processing unit 107 calculates contrast values of the respective aligned images. The contrast values can be calculated by a method similar to the method described above in step S401. Further, the contrast value calculated in step S401 may be converted in coordinate in consideration of deformation, and the converted contrast value may be used.

In step S702, the image processing unit 107 generates a composition map. In a method of generating the composition map, the image processing unit 107 compares the contrast values of pixels located at the same position in the images, and calculates a composition ratio corresponding to the magnitude of the contrast values. More specifically, among the pixels located at the same position, the composition ratio of 100% is given to the pixel having the largest contrast value, and the composition ratio of 0% is given to the other pixel located at the same position. In other words, the following equation (6) can be obtained.

$$A_m(x, y) = \max_{k=1} C_k(x, y) \quad (6)$$

In the equation (6), $C_k$(x, y) indicates the contrast value calculated in step S701, and $A_m$(x, y) indicates the ratio of the composition map. Further, m indicates an m-th image among the plurality of images different in in-focus position, x indicates a horizontal coordinate of the image, and y indicates a vertical coordinate of the image.

In step S702, the composition ratio is appropriately adjusted to prevent a boundary portion from becoming unnatural. As a result, the composition ratio of the composition map in one image is not binarized to 0% and 100% but continuously changes.

In step S703, the image processing unit 107 generates a composite image based on the composition map. The generated composite image has a deeper depth of field than the depth of field of each of the captured images because the composite image is generated by extracting the focusing areas in the captured images.

The above-described exemplary embodiment is merely illustrative, and various modifications can be implemented. For example, the following modifications can be made.

In the example described above, in the case where the detected motion vectors satisfy the predetermined condition in step S406, the conversion coefficient is calculated in step S410 by using all of the detected motion vectors. The calculation, however, is not limited thereto. For example, even in the case where the detected motion vectors satisfy the predetermined condition, in one embodiment, the control unit 101 uses the motion vectors from the focusing area detected in step S403 in the calculation of the conversion coefficient in step S410.

According to the first exemplary embodiment, in a case where such motion vectors that satisfy the predetermined condition cannot be calculated, the blocks are re-arranged in the focusing area, which allows for the alignment with higher accuracy.

A second exemplary embodiment is described below with reference to FIG. 8. Unlike the first exemplary embodiment, the blocks are arranged first based on the focusing area in the second exemplary embodiment. In the following, the present exemplary embodiment will be described by focusing on differences from the first exemplary embodiment.

A processing flow of the focus stacking composition according to the present exemplary embodiment is similar to the processing flow in FIG. 2 according to the first exemplary embodiment. Processing flows of the imaging and the image composition are also similar to the processing flows according to the first exemplary embodiment.

Figure 8:
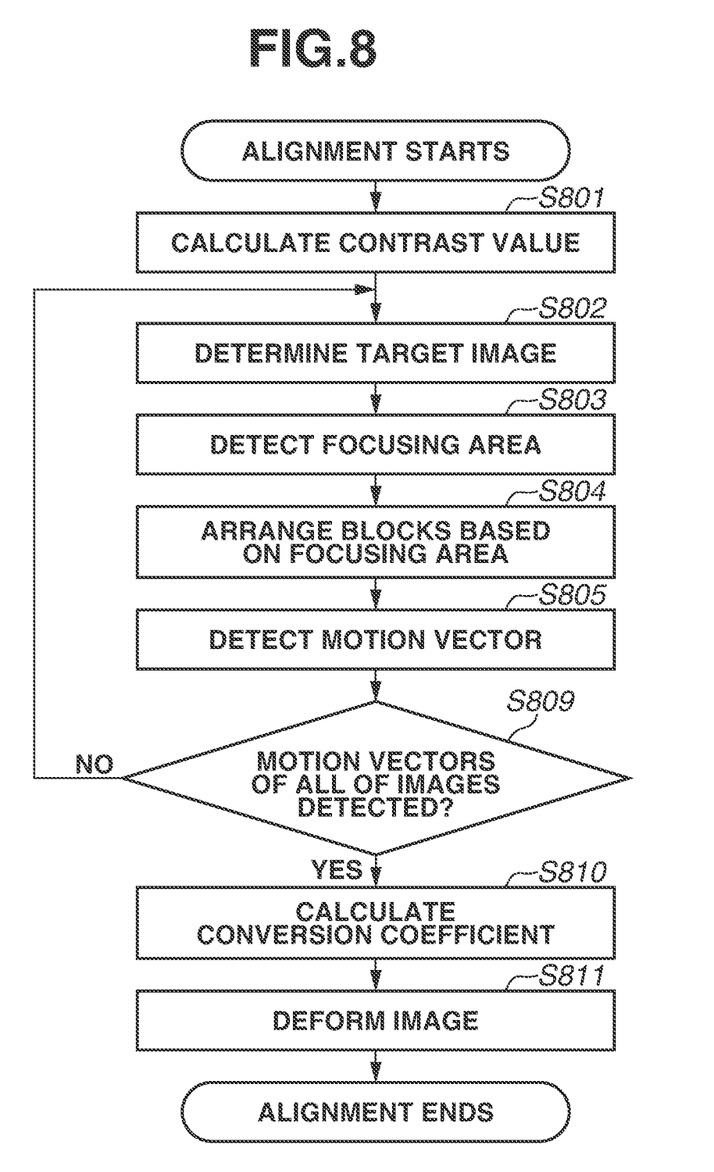
FIG. 8 is a flowchart illustrating alignment processing according to a second exemplary embodiment.

FIG. 8 is a flowchart illustrating alignment processing according to the present exemplary embodiment. Processing in steps S801 to S803 is similar to the processing in steps S401 to S403 according to the first exemplary embodiment.

In step S804, the control unit 101 arranges blocks based on the focusing area detected in step S803. A specific arrangement method may be, for example, the method described with reference to FIGS. 6A to 6E in the first exemplary embodiment.

In step S805, the control unit 101 detects a motion vector of each of the target images based on the blocks arranged in step S804.

In step S809, the control unit 101 determines whether motion vectors have been detected from all of the images. In a case where motion vectors have been detected from all of the images (YES in step S809), the processing proceeds to step S810. In a case where there is an image from which a motion vector has not been detected (NO in step S809), the processing returns to step S802.

Processing in steps S810 and S811 is similar to the processing in steps S410 and S411 according to the first exemplary embodiment.

Figure 9:
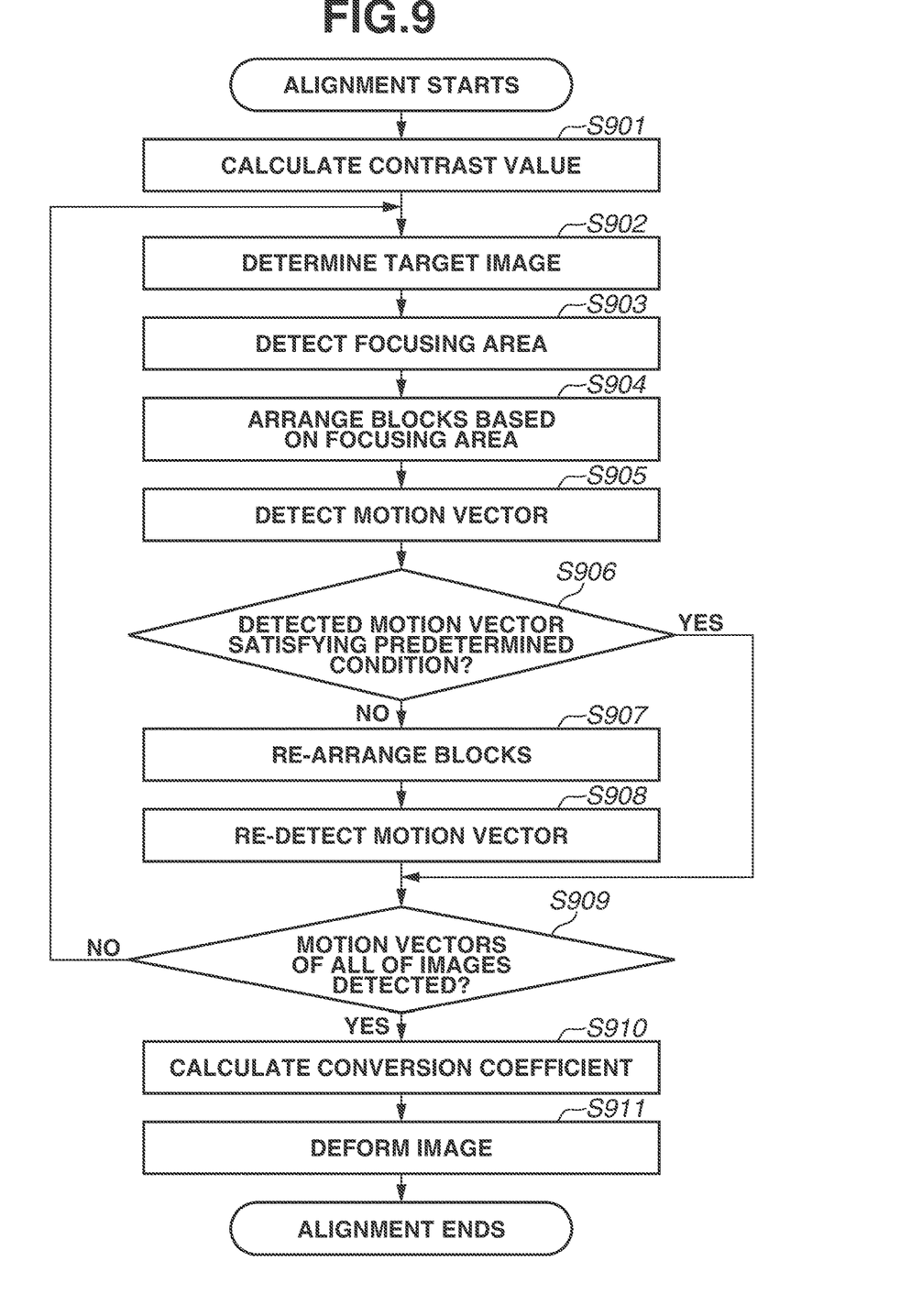
FIG. 9 is a flowchart illustrating another example of the alignment processing according to the second exemplary embodiment.

Further, as a modification of the present exemplary embodiment, the following implementation method is applicable. FIG. 9 is a flowchart illustrating a modification of the alignment processing according to the present exemplary embodiment. In the example illustrated in FIG. 8, after the motion vector is detected in step S805, the processing proceeds to the step of calculating the conversion coefficient. In the example illustrated in FIG. 9, the processing includes a step of determining whether the motion vectors satisfy the predetermined condition. In other words, in the example illustrated in FIG. 9, it is determined whether the detected motion vectors satisfy the predetermined condition in a manner similar to step S406 in the first exemplary embodiment. In a case where the detected motion vectors do not satisfy the predetermined condition (NO in step S906), the blocks are re-arranged in step S907. In the present exemplary embodiment, since the blocks are arranged in consideration of the focusing area in step S904, in one embodiment, the blocks are arranged with higher density in the rearrangement in step S907.

According to the second exemplary embodiment, a detection accuracy of a motion vector can be improved by arrangement of blocks used for detection of the motion vector based on the position of a focusing area.

Other Exemplary Embodiments

Although the above-described exemplary embodiments have been described based on implementation in a digital camera, the implementation is not limited to the digital camera. For example, the exemplary embodiments may be implemented in a mobile terminal with a built-in imaging device, or in a network camera that is capable of capturing an image.

The exemplary embodiments of the disclosure can be realized by supplying a program for realizing one or more functions of the exemplary embodiments to a system or an apparatus via a network or a storage medium and causing one or more processors of a computer of the system or the apparatus to read out and execute the program. Further, the exemplary embodiments of the disclosure can be realized by a circuit (e.g., ASIC) capable of realizing one or more functions.

Further features of the disclosure will become apparent from the following description of exemplary embodiments with reference to the attached drawings.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-014082, filed Jan. 30, 2020, which is hereby incorporated by reference herein in its entirety.

What is claimed is:

1. An apparatus, comprising:
at least one memory configured to store instructions; and
at least one processor in communication with the at least one memory and configured to execute the instructions to:
arrange a plurality of blocks in each of a plurality of images different in in-focus position in an optical axis direction;
detect a motion vector from each of the plurality of images by using the plurality of blocks;
align the plurality of images by using the motion vectors; and
re-arrange the plurality of blocks, in a case where the detected motion vectors do not satisfy a predetermined condition,
wherein the at least one processor further executes instructions to detect the motion vector by preferentially using a focusing area of each of the plurality of images.

2. The apparatus according to claim 1, wherein the at least one processor further executes instructions to generate a composite image by extracting the focusing areas of the respective images.

3. The apparatus according to claim 2, wherein the composite image has a depth of field deeper than a depth of field of each of the plurality of images.

4. The apparatus according to claim 1, wherein the at least one processor further executes instructions to detect the motion vector from a contrast of each of the plurality of images.

5. The apparatus according to claim 1, wherein the at least one processor further executes instructions to arrange a plurality of blocks similar to the plurality of blocks in each of the plurality of blocks.

6. The apparatus according to claim 5, wherein the at least one processor further executes instructions to re-arrange the plurality of blocks based on the focusing area.

7. The apparatus according to claim 6, wherein the at least one processor further executes instructions to re-arrange the plurality of blocks with at least one of a changed number of blocks, a changed size of each of the blocks, and changes positions of the blocks.

8. The apparatus according to claim 1, wherein the predetermined condition is a condition where a number of the motion vectors detected is greater than a predetermined number.

9. The apparatus according to claim 1, wherein the predetermined condition is a condition where a magnitude of each of the motion vectors is greater than a predetermined threshold value.

10. The apparatus according to claim 1, wherein the predetermined condition is a condition where deviation of the motion vectors is less than a predetermined threshold value.

11. The apparatus according to claim 1, wherein the at least one processor further executes instructions to detect the focusing area of each of the plurality of images by using contrast of the plurality of images.

12. An apparatus comprising:
a sensor to pick up a plurality of images at different in-focus positions in an optical axis direction;
at least one memory configured to store instructions; and at least one processor in communication with the at least one memory and configured to execute the instructions to:

arrange a plurality of blocks in each of the plurality of images;

detect a motion vector from each of the plurality of images; by using the plurality of blocks;

align the plurality of images by using the motion vectors; and re-arrange the plurality of blocks, in a case where the detected motion vectors do not satisfy a predetermined condition, wherein the at least one processor further executes instructions to detect the motion vector by preferentially using a focusing area of each of the plurality of images.

13. The apparatus according to claim 12, wherein the sensor records the focusing areas of the plurality of images in imaging.

14. A method comprising:

arranging a plurality of blocks in each of the plurality of images different in in-focus position in an optical axis direction;

detecting a motion vector from each of the plurality of images by using the plurality of blocks;

aligning the plurality of images by using the motion vectors; and re-arranging the plurality of blocks, in a case where the detected motion vectors do not satisfy a predetermined condition, wherein, in the detecting, the motion vector is detected by preferentially using a focusing area of each of the plurality of images.

15. The method according to claim 14, further comprising:

generating a composite image by extracting the focusing areas of the respective images.

16. A non-transitory computer-readable storage medium which stores a program for causing a computer of an apparatus to execute a method, the method comprising:

arranging a plurality of blocks in each of the plurality of images different in in-focus position in an optical axis direction;

detecting a motion vector from each of the plurality of images by using the plurality of blocks;

aligning the plurality of images by using the motion vectors; and re-arranging the plurality of blocks, in a case where the detected motion vectors do not satisfy a predetermined condition, wherein, in the detecting, the motion vector is detected by preferentially using a focusing area of each of the plurality of images.

17. The non-transitory computer-readable storage medium according to claim 16, further comprising:

generating a composite image by extracting the focusing areas of the respective images.

* * * * *